United States Patent
Rossanese

(10) Patent No.: US 7,540,733 B2
(45) Date of Patent: *Jun. 2, 2009

(54) APPARATUS FOR THE INJECTO-COMPRESSION MOULDING OF ARTICLES MADE OF PLASTIC MATERIAL WITH TWO COMPONENTS

(75) Inventor: Afro Rossanese, Noventa di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 769 days.

This patent is subject to a terminal disclaimer.

(21) Appl. No.: 11/046,937

(22) Filed: Jan. 31, 2005

(65) Prior Publication Data

US 2006/0076713 A1    Apr. 13, 2006

(30) Foreign Application Priority Data

Oct. 11, 2004  (IT) ............................ TO2004A0697

(51) Int. Cl.
B29C 45/13  (2006.01)
B29C 45/14  (2006.01)
B29C 45/56  (2006.01)

(52) U.S. Cl. .................... 425/112; 425/451.7; 425/576; 425/589

(58) Field of Classification Search ................ 425/112, 425/451.7, 576, 589, DIG. 129
See application file for complete search history.

(56) References Cited

U.S. PATENT DOCUMENTS

| | | | | |
|---|---|---|---|---|
| 3,196,485 A | * | 7/1965 | Battenfeld et al. ........... | 425/408 |
| 4,519,763 A | * | 5/1985 | Matsuda et al. ......... | 425/192 R |
| 4,642,039 A | * | 2/1987 | Anders ....................... | 425/140 |
| 5,069,613 A | * | 12/1991 | Inaba et al. .................. | 425/150 |
| 5,478,520 A | * | 12/1995 | Kasai et al. ............... | 264/328.1 |
| 5,681,519 A | * | 10/1997 | Kelman ...................... | 264/257 |
| 2006/0051453 A1 | * | 3/2006 | Imatomi ..................... | 425/589 |

FOREIGN PATENT DOCUMENTS

DE        10217584 A1  * 11/2002
JP        61241114 A   * 10/1986

OTHER PUBLICATIONS

U.S. Appl. No. 11/047,480, filed Jan. 31, 2005, Rossanese et al.
U.S. Appl. No. 11/047,500, filed Jan. 31, 2005, Rossanese et al.

(Continued)

*Primary Examiner*—Robert B Davis
(74) *Attorney, Agent, or Firm*—Heslin Rothenberg Farley & Mesiti P.C.; Victor A. Cardona, Esq.

(57) ABSTRACT

Described herein is injecto-compression moulding of articles made of plastic material with two components by means of a press of the stack-mould type in which the moulding cavity of the second component is maintained in a position of partial opening during the injection and compression of the first component within the first moulding cavity. There is moreover provided a retention system, which is associated to at least one of said first and second cavities.

7 Claims, 6 Drawing Sheets

OTHER PUBLICATIONS

U.S. Appl. No. 11/047,498, filed Jan. 31, 2005, Rossanese et al.
U.S. Appl. No. 11/047,483, filed Jan. 31, 2005, Rossanese et al.
U.S. Appl. No. 11/047,106, filed Jan. 31, 2005, Rossanese et al.
U.S. Appl. No. 11/047,104, filed Jan. 31, 2005, Rossanese et al.
U.S. Appl. No. 11/047,481, filed Jan. 31, 2005, Rossanese et al.

* cited by examiner

APPARATUS FOR THE INJECTO-COMPRESSION MOULDING OF ARTICLES MADE OF PLASTIC MATERIAL WITH TWO COMPONENTS

CROSS-REFERENCE TO RELATED APPLICATIONS

This application claims priority from Italian application number TO2004A000697, filed on Oct. 11, 2004, the entire disclosure of which is incorporated herein by reference.

This application also relates to U.S. patent application Ser. No. 11/047,480, filed on the same day as the present patent application, and titled "AN APPARATUS AND A METHOD FOR THE INJECTION-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,500, filed on the same day as the present patent application, and titled "A PROCESS FOR THE PRODUCTION OF PLATES MADE OF TRANSPARENT PLASTIC MATERIAL WITH NON-TRANSPARENT AREAS," the contents of which are incorporated herein by reference.

This application also relates to U.S. patent application Ser. No. 11/047,498, filed on the same day as the present patent application, and titled "A PROCESS FOR THE PRODUCTION OF PLATES MADE OF TRANSPARENT PLASTIC MATERIAL WITH NON-TRANSPARENT OVERINJECTED PARTS," the contents of which are incorporated herein by reference.

This application also relates to U.S. patent application Ser. No. 11/047,483, filed on the same day as the present patent application, and titled "A METHOD AND AN APPARATUS FOR THE PRODUCTION OF ARTICLES MADE OF MOULDED PLASTIC MATERIAL PARTICULARLY BY MEANS OF INJECTO-COMPRESSION," the contents of which are incorporated herein by reference.

This application also relates to U.S. patent application Ser. No. 11/047,106, filed on the same day as the present patent application, and titled "AN APPARATUS AND A METHOD FOR INJECTO-COMPRESSION MOULDING OF ARTICLES MADE OF PLASTIC MATERIAL WITH TWO COMPONENTS," the contents of which are incorporated herein by reference.

This application also relates to U.S. patent application Ser. No. 11/047,104, filed on the same day as the present patent application, and titled "A PROCESS FOR THE PRODUCTION OF PLATES MADE OF PLASTIC MATERIAL WITH PARTS OVERMOULDED BY INJECTO-COMPRESSION," the contents of which are incorporated herein by reference.

This application also relates to U.S. patent application Ser. No. 11/047,481, filed on the same day as the present patent application, and titled "A METHOD FOR THE PRODUCTION OF PLATES MADE OF PLASTIC MATERIAL WITH PARTS OVERMOULDED BY INJECTO-COMPRESSION," the contents of which are incorporated herein by reference.

FIELD OF THE INVENTION

The present invention relates to apparatuses for the moulding of articles made of moulded plastic material with two components, in two successive steps.

More in particular, the invention relates to an apparatus which can be associated to a press of the type comprising: a rotating central element, which bears a first mould and a second mould set opposite to one another; a first countermould and a second countermould, which are set on opposite sides with respect to the rotating central element and can be translated with respect thereto; means for closing said first and second countermoulds with respect to said first and second moulds to define, respectively, a first cavity and a second cavity; and means of injection and subsequent compression of a plastic material within said first and second cavities, respectively, for the moulding of said first component and the overmoulding of said second component.

STATE OF THE PRIOR ART

Moulding presses of the above type are conventionally called "stack-mould presses" and are used for moulding items with two components, including complex ones, in two successive steps: first, the first component is moulded using the first mould and the first countermould; then, by means of a rotation through 180° of the rotating central element, the first mould is located in a position corresponding to the second countermould for overmoulding of the second component on the first component. Simultaneously, by means of the second mould and the first countermould, the first component of a subsequent article is formed, and the cycle is then repeated in an identical way.

FIGS. 1 and 2 of the annexed plate of drawings are schematic representations of an example of a bi-component article which may be obtained with a press of the type specified above: the first component, formed with a first plastic material, is designated by 16 and consists, for example, of a transparent plate of large dimensions, typically made of polycarbonate, and the second component is designated by 14 and is, for example, constituted by a perimetral frame made of a different plastic material, which is non-transparent, formed with appendages and attachments 15, 16 for the assembly of the product on a supporting structure, for instance the body of a motor vehicle.

FIG. 3 is a schematic illustration, in side elevation, of a stack-mould press of a conventional type that constitutes the starting point of the present invention. It comprises, in brief, a pair of press surfaces 1, 2, to which there are associated respective screw-type injection assemblies 7, 8 and which are set on opposite sides with respect to a central element 4 rotating about a vertical axis 6. The press surfaces 1, 2 bear, via respective plates 3 and 5, two countermoulds 9, 12 facing respective moulds 10, 11, carried by the rotating central element 4. The press is equipped with a closing system, not illustrated in so far as it is of a conventional kind, through which the press surfaces 1, 2 and hence the plates 3, 5 with the countermoulds 9, 12 are closed on opposite sides against the rotating central element 4 so as to define two moulding cavities, within which, via the assemblies 7 and 8, the plastic material is injected in the fluid state. In this way, in the cavity defined between the countermould 9 and the mould 10 there is, for example, formed the first component 13 of the article represented in FIGS. 1 and 2, whilst in the cavity defined between the countermould 12 and the mould 11 the second component 14 is overmoulded on the first component 13 previously formed. Transfer of the first component 13 from the position corresponding to the countermould 9 towards the position corresponding to the countermould 12 is obtained, as already explained, as a result of the rotation through 180° of the central element 4 about the axis 6. The final piece formed by the two components 13 and 14 is finally unloaded from the press.

A stack-mould press of this type is described, for example, in the document No. DE-A-10217584.

The above system thus enables management of the injection of the two components that are to constitute the finished article with the same closing system. However, in the case of pieces of large dimensions, there is the problem of guaranteeing the necessary quality of the moulded items in terms of absence of deformations or warping and maintenance of the best possible mechanical characteristics. This applies particularly to the case of large plates made of transparent plastic material, typically polycarbonate, for which it is necessary to prevent the presence of residual stresses that would impair the optical characteristics thereof. For this reason, it would be convenient, precisely for the purpose of improving the characteristics of the items produced, to adopt a technique of injecto-compression consisting in the performance of a step of compression following upon the step of injection of the plastic material within the mould, or simultaneously with said injection step. This technique would enable a notable reduction in the residual stresses to be obtained in the material injected within the cavity of the mould.

However, the method of injection-compression on both of the sides of a stack-mould press involves a series of problems. The sequence of the various moulding parts has in fact some critical elements that disturb the correct behaviour thereof and cause undesirable defects on the pieces produced.

For example, with the stack-mould press according to the already cited document No. DE-A-10217584 the moulding cycle initially envisages complete closing of the mould for guaranteeing correct positioning of the press surfaces prior to performing the injecto-compression of the first component. The positioning is affected by incorrect tolerances: forces on the previously moulded piece, elasticity of the press surfaces, forces due to possible closing frames, etc.

Once the end of the compression step is reached, the mould is resting on its surfaces and hence in a correct position. To be able to perform injecto-compression of the other component it is necessary to re-open the mould and, by actuating the purposely provided closing frames in a correct way, an effect of release of the force of closing of the first moulded piece is obtained on account of the need to open the other two press surfaces. During compression of the second component, the first component is then affected by a further pressure corresponding to the one necessary for the second component. The effect of release of the pressure, of opening of the mould with possible movements, and of renewal of closing may cause serious damage to the first moulded item. Furthermore, the opening of the mould involves an undesirable increase in the cycle time.

SUMMARY OF THE INVENTION

The purpose of the present invention is to solve the aforesaid technical problem, enabling performance of the step of injection of the material in both of the steps, maintaining both of the cavities half open, and moreover performance of the step of compression, without any need to carry out particular movements of the mould that may damage the result of moulding of the first component, at the same time reducing the cycle times.

According to the invention, this purpose is achieved thanks to the fact that a moulding apparatus of the type defined previously moreover includes deactivatable contrast means associated to at least said second countermould for maintaining said second cavity in a position of partial opening during injection and compression of said first component within said first cavity, and actuator means for deactivating said contrast means, at the end of compression of said first component and prior to the step of compression of said second component within said second cavity.

The deactivatable contrast means may possibly also be associated to the first countermould to enable its use according to the conditions of injection and to the unbalancing of the forces that are produced.

Thanks to the above ideas of solution, it is possible to provide a moulding sequence that enables prevention of re-opening of the press surfaces and proceeding immediately to the injection of the second component without removing or reducing even partially the pressure on the moulding cavity of the first component. This enables an appreciable shortening in the cycle times, preventing the first moulded component from feeling the effects of sharp movements and of the removal and restoring of pressure.

Conveniently, the aforesaid contrast means include mobile members, for example wedge-shaped ones which can be engaged and disengaged with respect to corresponding contrast seats formed between said second mould and said second countermould. Said wedge-shaped mobile members and the corresponding contrast seats conveniently have conical surfaces, and are distributed along the perimeter of said second mould and second countermould.

According to a further characteristic of the invention, the aforesaid contrast means can be combined with retention means associated to at least one of said first and second cavities for constraining to said central element the corresponding countermould for a pre-set opening stroke of said at least one cavity prior to injection of the plastic material within said first and second cavities.

The contrast means and the retention means, where present, can be used in one or the other or in both of the steps, in any temporal order.

Also a subject of the present invention is a process for the moulding by means of injecto-compression of both of the components of bi-component articles made of plastic material by means of a press of the stack-mould type.

BRIEF DESCRIPTION OF THE DRAWINGS

In the annexed drawings:

FIG. 7 is a view similar to that of FIG. 4, simplified and at a reduced scale, which shows a further aspect of the apparatus according to the invention; and FIG. 8 shows, at an enlarged scale, a detail of FIG. 7.

DETAILED DESCRIPTION OF THE INVENTION

Figure 1:
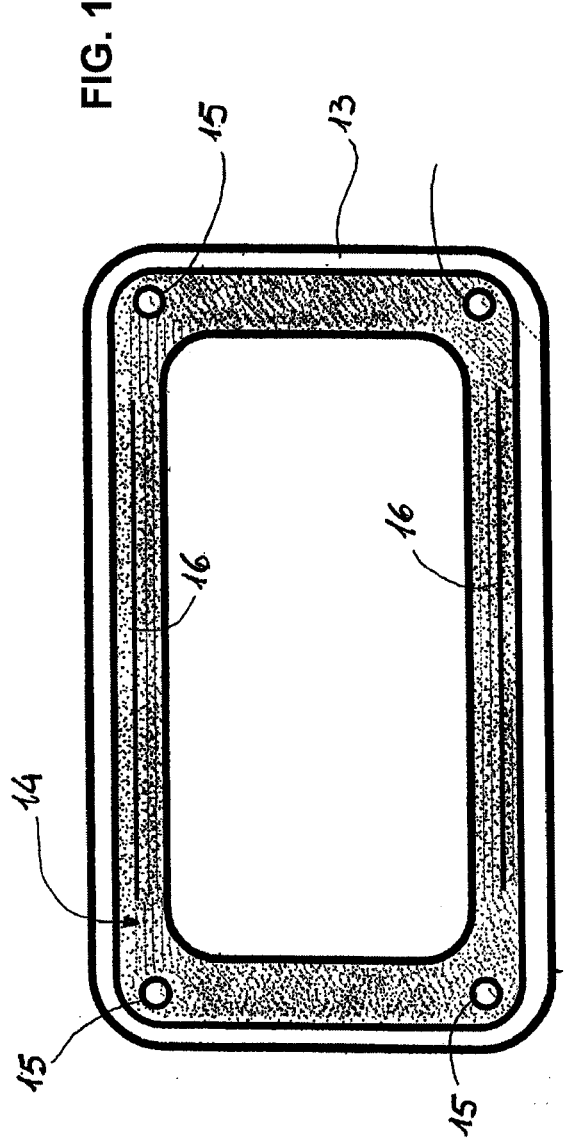
FIG. 1 is a schematic dorsal elevation of a bi-component plate made of plastic material obtained with the apparatus according to the invention.
Figure 2:
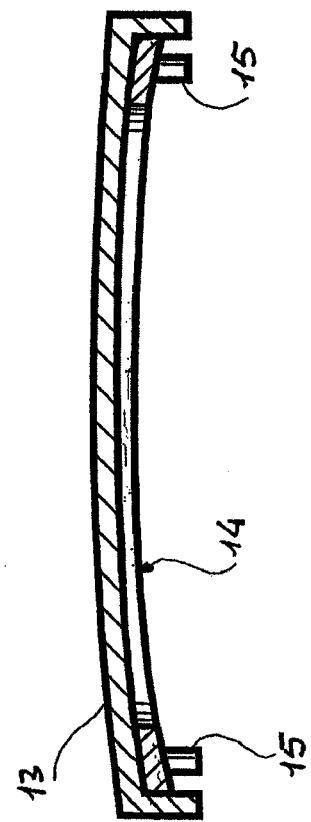
FIG. 2 is a partially sectioned side elevation of FIG. 1.

In synthesis, the moulding apparatus according to the invention enables, as already explained, effective performance of the injecto-compression of two plastic materials injected within the cavity of the two moulds for the formation, respectively, of the first component and of the second component (for example, the ones designated by the reference numbers 13 and 14 in FIGS. 1 and 2) described previously of a bi-component article.

Figure 3:
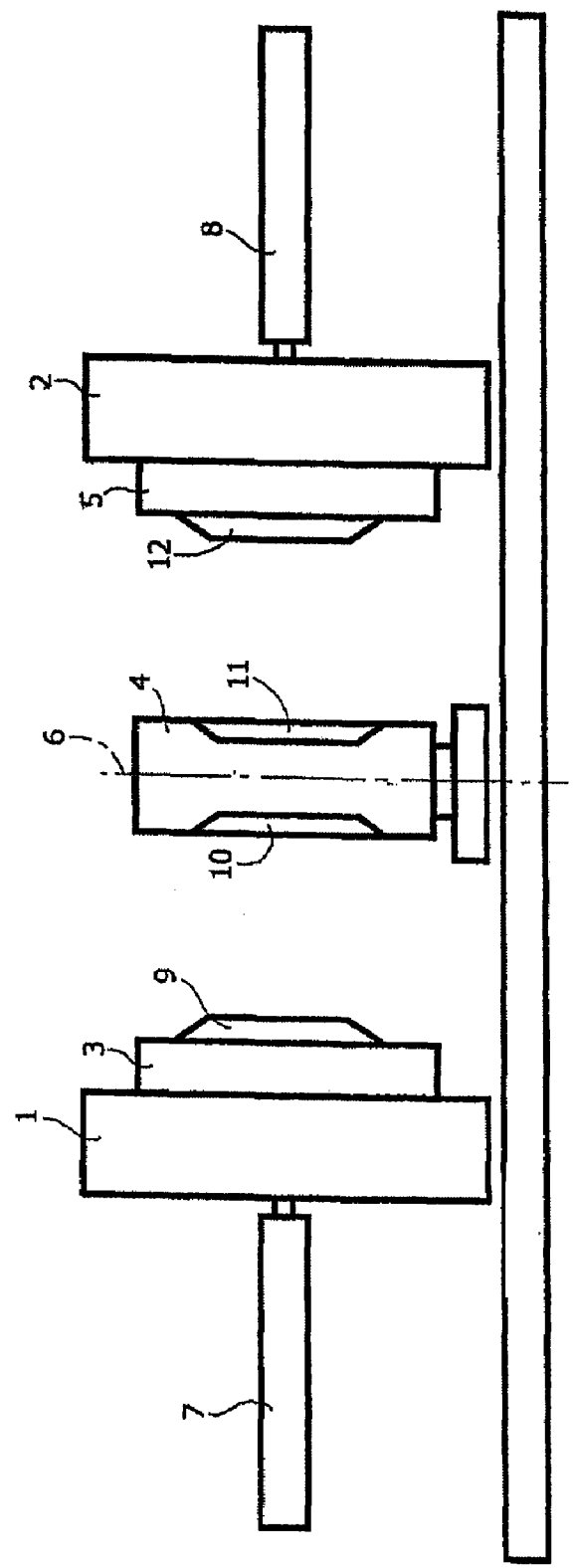
FIG. 3 is a schematic and simplified view in elevation of a press of the stack-mould type according to the prior art.
Figure 4:
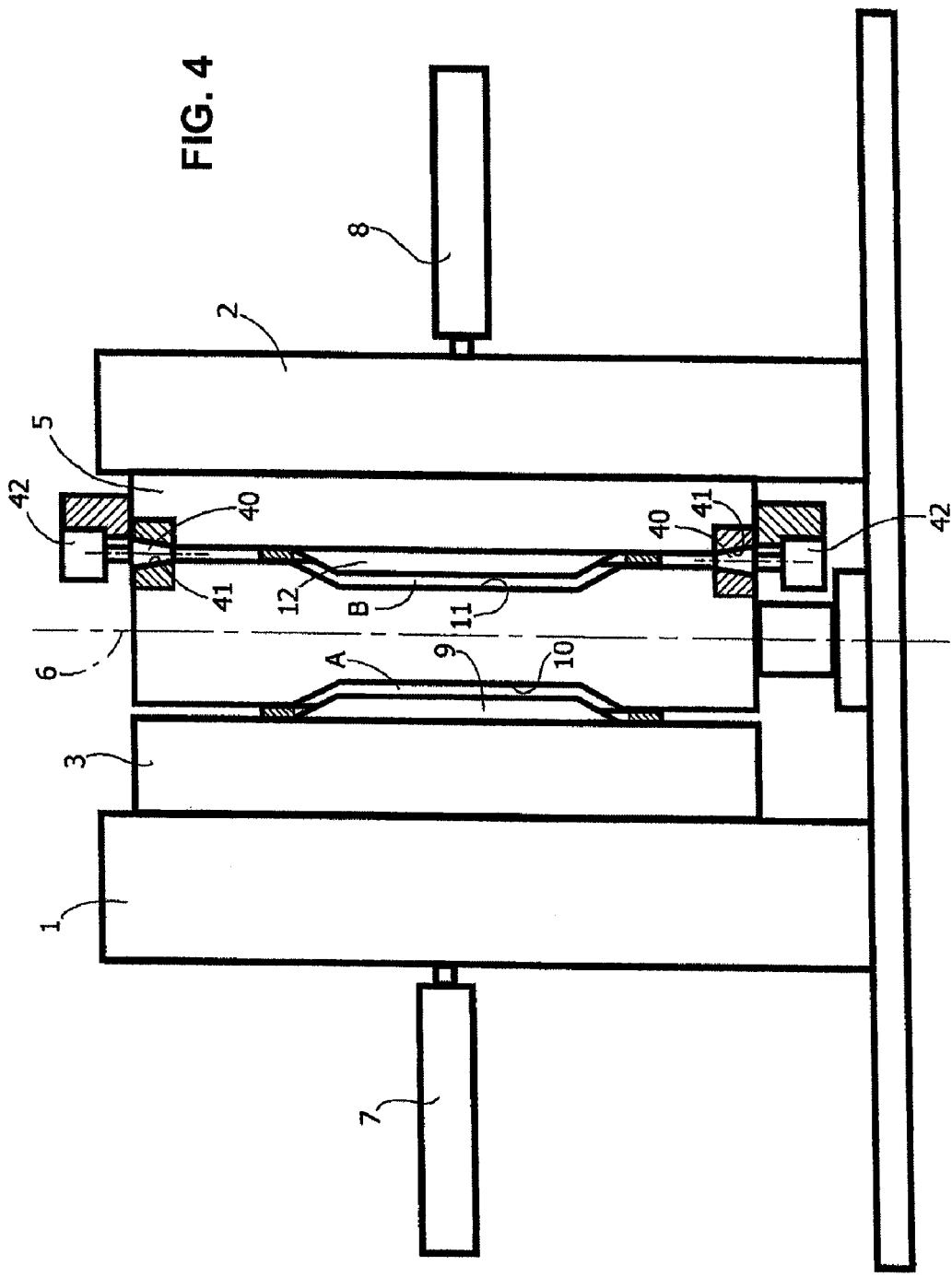
FIG. 4 is a partially sectioned view in partial side elevation, and at an enlarged scale, of an apparatus according to the invention.

FIG. 4, in which parts that are identical or similar to the ones already described previously with reference to FIG. 3 are designated by the same reference numbers, illustrates an embodiment of the apparatus according to the invention.

The apparatus is equipped with a series of contrasts or rests 40 set between the second mould 11 and second countermould 12 defining the second moulding cavity B which are able to support the closing force during the step of injecto-compression within the first cavity A comprised between the first mould 10 and the first countermould 9, and then be disengaged to enable injecto-compression within the second chamber B. The contrast elements 40 are constituted by wedge-shaped mobile members engageable and disengageable with respect to corresponding contrast seats 41 formed between the second mould 11 and second countermould 12. Although in FIG. 4 only two contrast members 40 are illustrated, they will be appropriately distributed along the entire perimeter of the second mould 11 and second countermould 12 so as to ensure the necessary reaction to the closing force between the first mould 10 and the first countermould 9.

Each wedge-shaped contrast member 40 and the respective contrast seat 41 conveniently have a conical surface, which enables the mutual coupling/decoupling thereof also in the condition of applied load, i.e., also maintaining the closing force or at least part thereof. Of course, the conicity of said surfaces must be calculated taking into account the forces of closing and the forces of friction that can develop as a result of the mutual coupling/decoupling.

Figure 5:
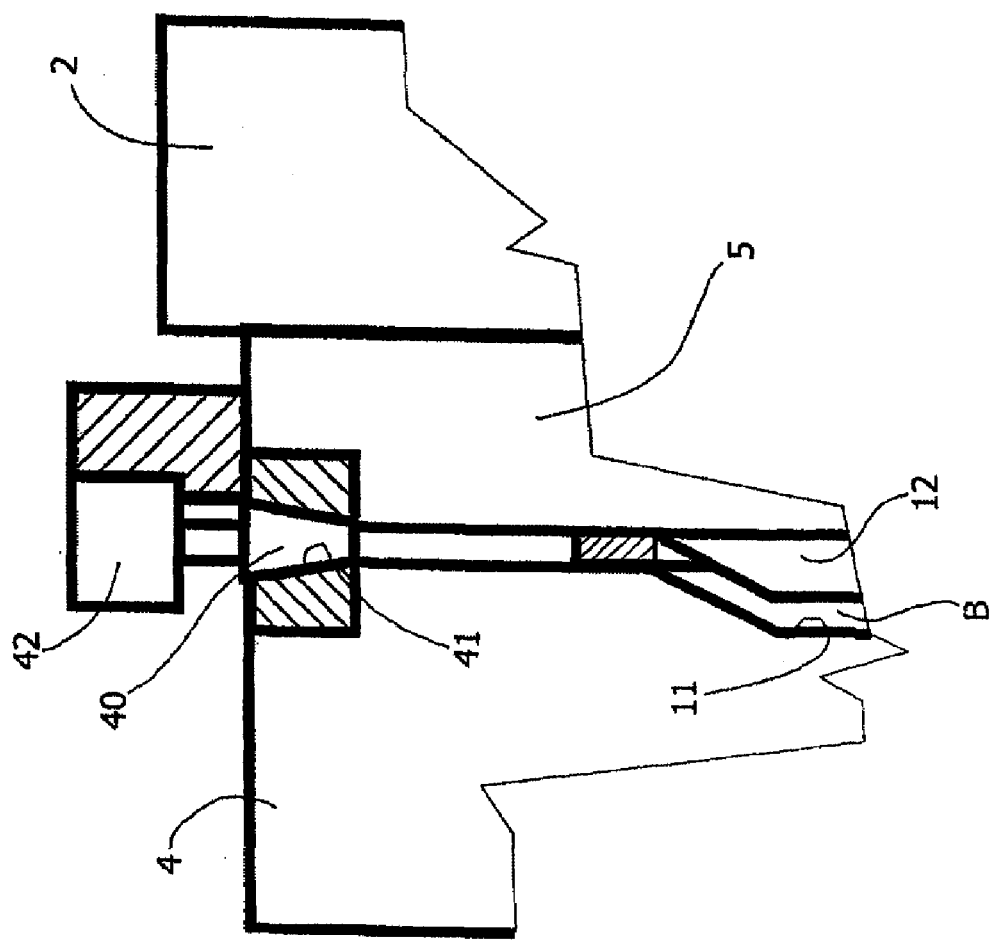
FIG. 5 shows, at an enlarged scale, a detail of FIG. 4.

Each wedge-shaped contrast member 40 is, in the case of the example illustrated, actuated via a respective fluid-driven actuator 42 that controls displacement thereof between the engaged position within the corresponding seat 41, represented in FIG. 4 and in the detail of FIG. 5, and a disengaged position with respect to said seat.

Figure 6:
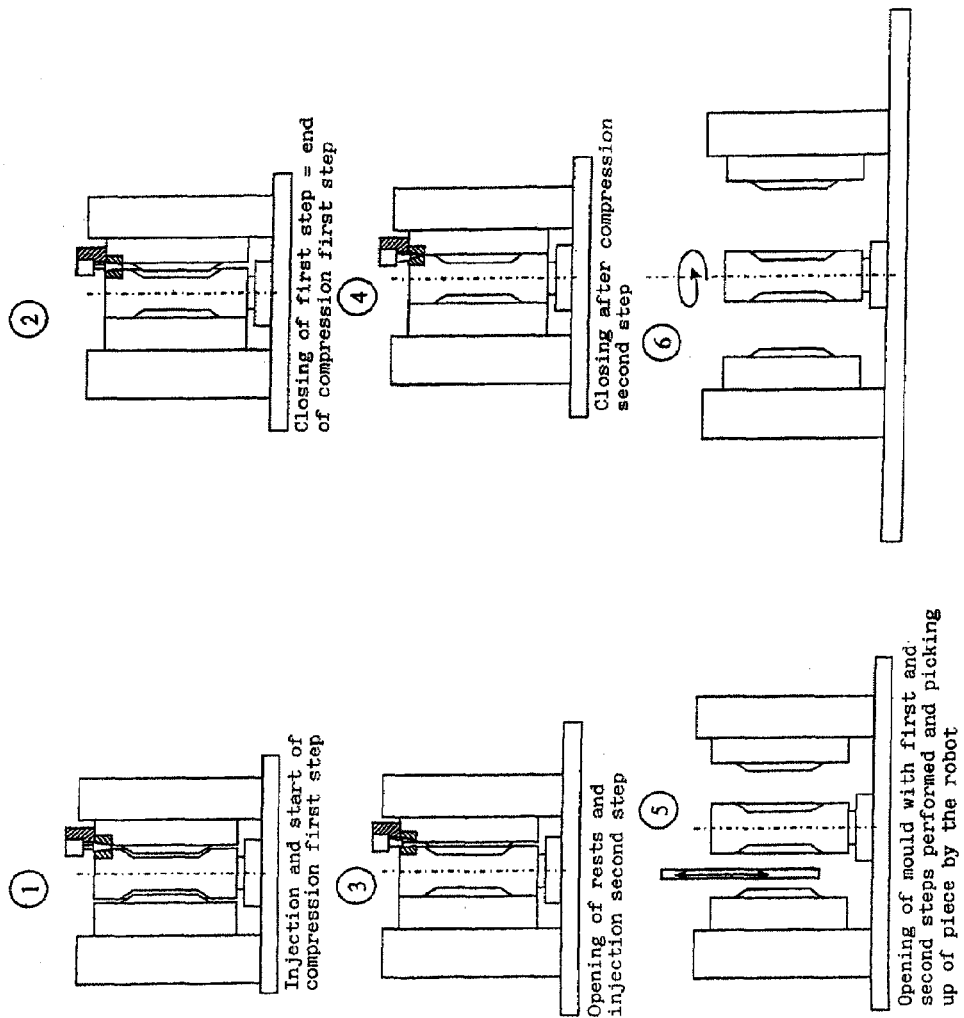
FIG. 6 shows, in the form of a diagram, the different steps of the moulding cycle performed by the apparatus according to the invention.

With this arrangement, the moulding sequence followed by the apparatus according to the invention is exemplified in FIG. 6. Said sequence enables prevention of re-opening of the surfaces of the press 1, 2 following upon injecto-compression moulding of the first component within the first moulding cavity A and enables proceeding immediately to the injection of the second component in the cavity B, without discharging, or discharging only partially, the pressure from the first cavity A. In detail, the steps of the cycle represented schematically in FIG. 6 are the following:

1. injection and start of compression of the first component within the first cavity A, whilst the second cavity B is kept partially open by the contrast members 40 engaged in the corresponding seats 41;
2. closing of the first cavity A and end of compression;
3. disengagement of the contrast members 40 and injection of the second component in the second cavity B;
4. closing of the second cavity B and compression of the second component;
5. opening of the two moulds and picking-up of the finished bi-component piece; and
6. rotation of the central element 4.

The times for the execution of these steps are appreciably shorter than the ones required for the execution of the same cycle in a conventional way, i.e., in the absence of the contrast members 40, and above all the first moulded component within the cavity A will not feel the effects of sharp movements and of removal and restoration of pressure for moulding of the second component.

Figures 7, 8:
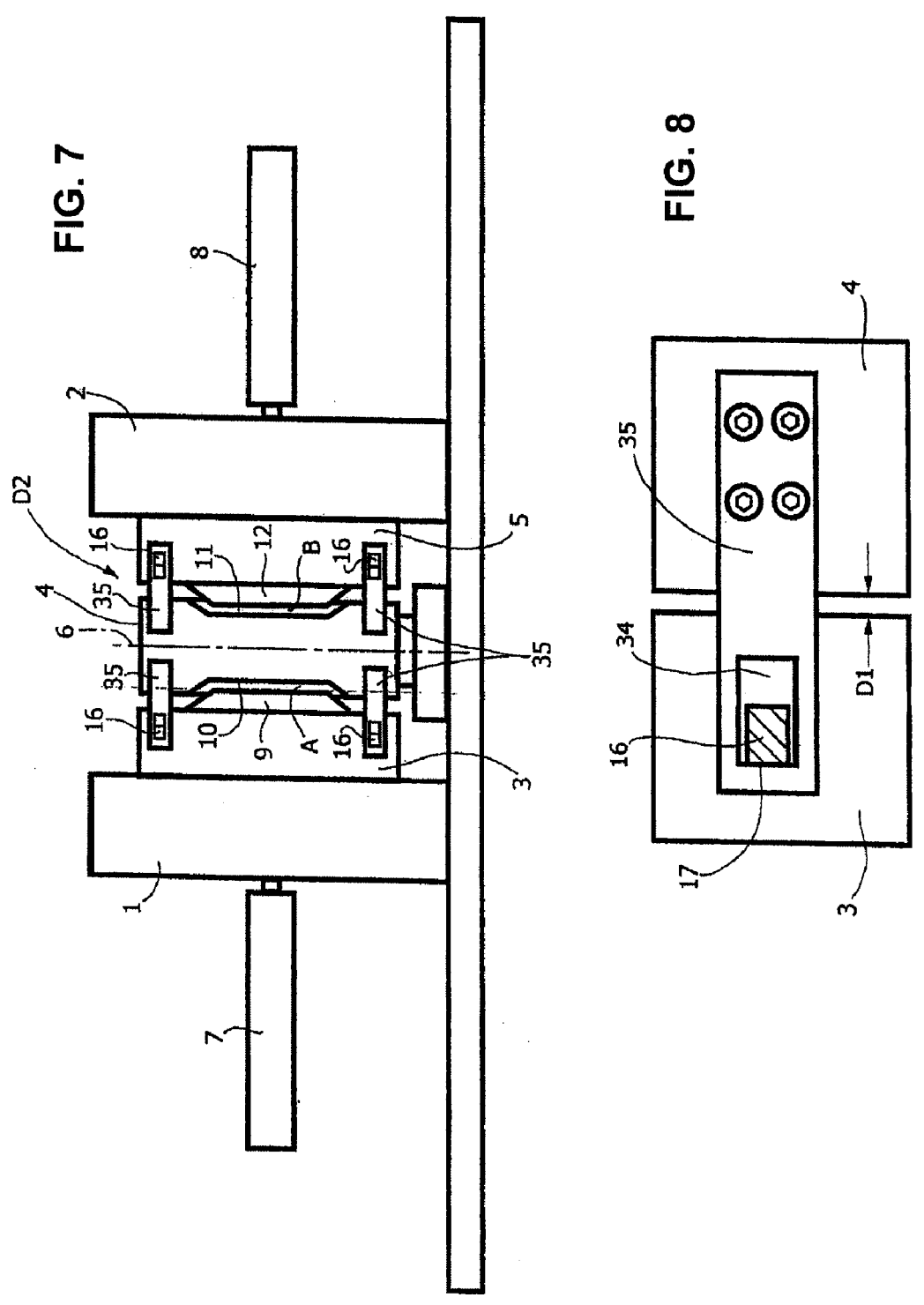

In the case where the injecto-compression within the second cavity B is performed by over-moulding the second component on the first, as precisely in the case of products of the type illustrated in FIGS. 1 and 2, it may become necessary to resort to particular retention members (hooks), which are able to block opening of the countermoulds with respect to the moulds at a desired distance. These retention devices, which form the specific subject of a parallel Italian patent application filed on the same date by the present applicant, are illustrated in FIGS. 7 and 8. As may be seen in said figures, the plate 3, 5 of each countermould 9, 12 bears on each side a series (in the example illustrated two in number) of projecting contrasts 16, each of which is engaged within an elongated opening 34 of a hook-like bar 35, carried by the rotating central element 4. Each contrast 16, constituted for example by a simple square pin, is able to slide horizontally within the opening 34 of the respective hook-like bar 35 in such a way as to enable opening of the countermould 9, or of the countermould 12, with respect to the corresponding mould 10 or 11 by an amount designated, respectively, by D1 (FIG. 8) and D2 (FIG. 7). In a position corresponding to said distances, each contrast 16 bears upon the outer end 17 of the opening 34 of the respective hook 35. The length of said elongated opening 34 will in any case be sufficient to enable free closing of the one or the other countermould 9, 12.

The contrasts 16 can be engaged and disengaged within the corresponding elongated openings 34 of the respective hooks 35 via respective motor-driven actuators, not illustrated.

Even though in the example illustrated the hook-like devices 35 are operatively associated to both of the countermoulds 9 and 12, it should be noted that they may be applied only to one or the other countermould, in association with the moulding cavity with larger thrust surface.

The moulding sequence of the apparatus equipped both with the contrast members 40 (for reasons of simplicity omitted in FIG. 7), and with the retention members 16, 35 will thus envisage the steps of: approach of the surfaces of the mould; activation of the retention members 16, 35 of the first step; opening of the surfaces at the distance corresponding to the sum of the spaces to be left free for the two steps of injecto-compression; activation of the contrast members 40; injection, and subsequent compression of the first step; then start of injection of the second step; disengagement of the contrast members 40; and subsequent compression of the second step.

Of course, the details of construction and the embodiments may vary widely with respect to what is described and illustrated herein, without thereby departing from the scope of the present invention. Thus, the deactivatable contrast means may possibly also be associated to the first countermould in order to enable their use according to the conditions of injection and of unbalancing of the forces that are produced. Furthermore, the contrast means and the retention means, where present, can be used in one or the other or in both of the steps, in any temporal order.

The invention claimed is:

1. An apparatus for the moulding of articles made of plastic material with two components comprising:
    a rotating central element, which bears a first mould and a second mould set opposite to one another;
    a first countermould and a second countermould, which are set on opposite sides with respect to the rotating central element and can be translated with respect thereto;
    means for closing said first and second countermoulds with respect to said first and second moulds to define, respectively, a first moulding cavity and a second moulding cavity; means for injection and compression of a plastic material within said first and second cavities, respectively, for the moulding of said first component and the overmoulding of said second component; and deactivatable contrast means, which are associated to at least said second countermould for maintaining said second cavity in a position of partial opening during injection and compression of said first component within said first cavity, and means for deactivating said contrast means, at the end of the compression of said first component and prior to an injection of said second component and the compression of said second component within said second cavity.

2. The apparatus according to claim 1, further comprising retention means, which are associated to at least one of said first and second cavities for constraining to said central element the corresponding countermould for a pre-set stroke of opening of said at least one cavity prior to injection of the plastic material within said first and second cavities.

3. The apparatus according to claim 1, wherein said contrast means include wedge-shaped mobile members, which can be engaged and disengaged with respect to corresponding contrast seats formed between said second mould and said second countermould.

4. The apparatus according to claim 3, wherein said wedge-shaped members and the corresponding contrast seats have complementary conical surfaces.

5. The apparatus according to claim 1, wherein said contrast means are distributed along the perimeter of said second mould and said second countermould.

6. The apparatus according to claim 2, wherein said first and second cavities define different thrust surfaces for the injected plastic material, and in that said retention means are operatively associated only to a cavity of the first and second cavities with a larger thrust surface.

7. The apparatus according to claim 6, wherein said retention means include generally hook-like members engaged with play on corresponding mobile contrasts carried by one or both of said first and second countermoulds.

* * * * *